(12) United States Patent
Hsiao et al.

(10) Patent No.: US 8,976,315 B2
(45) Date of Patent: Mar. 10, 2015

(54) LIQUID CRYSTAL DISPLAY MODULE

(75) Inventors: Yuchun Hsiao, Guandong (CN); Zexin Wu, Guandong (CN)

(73) Assignee: Shenzhen China Star Optoelectronics Technology co., Ltd., Shenzhen, Guangdong (CN)

( * ) Notice: Subject to any disclaimer, the term of this patent is extended or adjusted under 35 U.S.C. 154(b) by 156 days.

(21) Appl. No.: 13/699,048

(22) PCT Filed: Sep. 14, 2012

(86) PCT No.: PCT/CN2012/081373
§ 371 (c)(1),
(2), (4) Date: Nov. 20, 2012

(87) PCT Pub. No.: WO2014/036756
PCT Pub. Date: Mar. 13, 2014

(65) Prior Publication Data
US 2014/0071373 A1    Mar. 13, 2014

(30) Foreign Application Priority Data
Sep. 7, 2012 (CN) .......................... 2012 1 0330304

(51) Int. Cl.
*G02F 1/1333* (2006.01)
(52) U.S. Cl.
CPC ........ *G02F 1/1333* (2013.01); *G02F 1/133308* (2013.01); *G02F 2001/13332* (2013.01)
USPC ........................................... 349/58

(58) Field of Classification Search
USPC ............................ 349/58; 361/679.21–679.3; 362/632–634
See application file for complete search history.

(56) References Cited

U.S. PATENT DOCUMENTS

| | | | |
|---|---|---|---|
| 2008/0024694 A1* | 1/2008 | Kondo et al. | 349/58 |
| 2008/0094535 A1* | 4/2008 | Suh et al. | 349/58 |
| 2010/0073594 A1* | 3/2010 | Miyazaki | 349/58 |
| 2010/0165642 A1 | 7/2010 | Hsieh et al. | |

FOREIGN PATENT DOCUMENTS

| | | |
|---|---|---|
| CN | 101261789 A | 9/2008 |
| CN | 101404743 A | 4/2009 |
| CN | 202149990 U | 2/2012 |
| CN | 102445777 A | 5/2012 |
| CN | 102519023 A | 6/2012 |
| CN | 202330931 U | 7/2012 |

* cited by examiner

*Primary Examiner* — Michael Caley
(74) *Attorney, Agent, or Firm* — Andrew C. Cheng

(57) ABSTRACT

The present invention provides a liquid crystal display module, which includes a backlight module, a mold frame arranged on the backlight module, a liquid crystal display panel arranged on the mold frame, and a bezel arranged on the liquid crystal display panel and fixed to the backlight module. The backlight module includes a backplane. The backplane includes a bottom board and a side board connected to the bottom board. The bezel includes a front wall and a side wall connected to the front wall. The side board forms a projection toward the side wall. The projection forms a threaded hole. The side wall forms a receiving hole corresponding to the projection. The projection is completely received in the receiving hole and secured to the receiving hole by a bolt.

11 Claims, 5 Drawing Sheets

LIQUID CRYSTAL DISPLAY MODULE

BACKGROUND OF THE INVENTION

1. Field of the Invention

The present invention relates to the field of liquid crystal displaying, and in particular to a liquid crystal display module.

2. The Related Arts

Liquid crystal display (LCD) has a variety of advantages, such as thin device body, low power consumption, and being free of radiation, and is thus widely used. Most of the LCDs that are currently available in the market are backlighting LCDs, which comprise an enclosure, a liquid crystal panel received in the enclosure, and a backlight module arranged inside the enclosure. The operation principle of the liquid crystal panel is that liquid crystal molecules are interposed between two parallel glass substrates and a plurality of vertical and horizontal fine electrical wires is arranged between the two glass substrates, whereby the liquid crystal molecules are controlled to change direction by application of electricity in order to refract light emitting from the backlight module for generating images. Since the liquid crystal panel itself does not emit light, light must be provided by the backlight module in order to normally display images. Thus, the backlight module is one of the key components of an LCD. The backlight module can be classified in two types, namely side-edge backlight module and direct backlight module, according to the position where light gets incident. The direct backlight module arranges a light source, such as a cold cathode fluorescent lamp (CCFL) or a light-emitting diode (LED) at the back side of the liquid crystal panel to form a planar light source that directly provides lighting to the liquid crystal panel. The side-edge backlight module arranges a backlight source of LED light bar at an edge of a back panel to be located rearward of one side of the liquid crystal panel. The LED light bar emits light that enters a light guide plate (LGP) through a light incident face of the light guide plate and is projected out through a light exit face of the light guide plate, after being reflected and diffused, to thereby transmit through an optic film assembly and form a planar light source for the liquid crystal panel.

Referring to FIG. 1, a liquid crystal display module generally comprises a backlight module 100, a mold frame 300 arranged on the backlight module 100, a liquid crystal display panel 500 arranged on the mold frame 300, and a bezel 700 arranged on the liquid crystal display panel 500. The backlight module 100 comprises a backplane 110, a backlight source 130 arranged inside the backlight module 100, a reflector plate 150 arranged inside the backplane 110, and a light guide plate 170 arranged atop the reflector plate 150, and an optic film assembly 190 arranged above the light guide plate 170. The mold frame 300 supports the liquid crystal display panel 500 and the bezel 700 is fixed to the backplane 110 of the backlight module 100 to complete the liquid crystal display module.

Referring to FIG. 2, a conventional liquid crystal display module is often provided with such a fixing structure as to have the bezel 700 coupled to the backplane 110 with a projection 113 that is formed on a side board 111 of the backplane 110 and is drawn upward and subjected to internal tapping to form a tapped hole 115. A through hole 711 is defined in a sidewall 710 of the bezel 700 to correspond to the tapped hole 115. A bolt secures the bezel 700 and the backplane 110 together.

Fixing made in this way, when compared to fixing made at the front side, can reduce the thickness of the bezel. However, drawing and tapping are made on the inner side of the module, meaning the threading engagement is also made inside the module. This requires a bolt having a length equal to the sum of a portion of the bezel thickness, backplane thickness, and drawing height. This length will impose a significant influence to a slim bezel design and is adverse to bezel slimming of a liquid crystal display device.

SUMMARY OF THE INVENTION

An object of the present invention is to provide a liquid crystal display module, which effectively reduces bezel thickness and facilitates bezel slimming of liquid crystal display device.

To achieve the above object, the present invention provides a liquid crystal display module, which comprises a backlight module, a mold frame arranged on the backlight module, a liquid crystal display panel arranged on the mold frame, and a bezel arranged on the liquid crystal display panel and fixed to the backlight module. The backlight module comprises a backplane. The backplane comprises a bottom board and a side board connected to the bottom board. The bezel comprises a front wall and a side wall connected to the front wall. The side board forms a projection toward the side wall. The projection forms a threaded hole. The side wall forms a receiving hole corresponding to the projection. The projection is completely received in the receiving hole and secured to the receiving hole by a bolt.

The side wall forms an opening. The opening is located above the receiving hole. The mold frame forms an outward-projecting engagement section corresponding to the opening. The engagement section comprises a slope that is inclined outward.

The projection has a height that is smaller than or equal to depth of the receiving hole.

The projection and the threaded hole are formed through drawing tapping.

The side wall also forms a recess and the receiving hole is formed in the recess, whereby when a bolt is applied for fixing, the bolt is screwed into the threaded hole with a bolt head positioned against bottom of the recess. The recess has a depth that is greater than or equal to the thickness of the bolt head.

The mold frame forms a receiving chamber corresponding to the liquid crystal display panel to allow the liquid crystal display panel to be received in the receiving chamber.

The liquid crystal display panel comprises a TFT substrate, a CF substrate laminated on the TFT substrate, and liquid crystal interposed between the TFT substrate and the CF substrate.

The liquid crystal display panel further comprises a first polarizer laminated on a surface of the TFT substrate that is away from the CF substrate and a second polarizer laminated on a surface of the CF substrate that is away from the TFT substrate.

The backlight module further comprises a backlight source arranged inside the backplane, a reflector plate arranged inside the backplane, a light guide plate and arranged on the reflector plate, and an optical film assembly arranged atop the light guide plate.

The backlight source comprises a linear LED light bar, which is fixed by thermal paste to the side board of the backplane.

The present invention also provides a liquid crystal display module, which comprises a backlight module, a mold frame arranged on the backlight module, a liquid crystal display panel arranged on the mold frame, and a bezel arranged on the liquid crystal display panel and fixed to the backlight module, the backlight module comprising a backplane, the backplane comprising a bottom board and a side board connected to the bottom board, the bezel comprising a front wall and a side wall connected to the front wall, the side board forming a projection toward the side wall, the projection forming a threaded hole, the side wall forming a receiving hole corresponding to the projection, the projection being completely received in the receiving hole and secured to the receiving hole by a bolt;

wherein the side wall forms an opening, the opening being located above the receiving hole, the mold frame forming an outward-projecting engagement section corresponding to the opening, the engagement section comprising a slope that is inclined outward;

wherein the projection has a height that is smaller than or equal to depth of the receiving hole;

wherein the projection and the threaded hole are formed through drawing tapping;

wherein the side wall also forms a recess and the receiving hole is formed in the recess, whereby when a bolt is applied for fixing, the bolt is screwed into the threaded hole with a both head positioned against bottom of the recess, the recess having a depth that is greater than or equal to the thickness of the bolt head;

wherein the mold frame forms a receiving chamber corresponding to the liquid crystal display panel to allow the liquid crystal display panel 6 to be received in the receiving chamber;

wherein the liquid crystal display panel comprises a TFT substrate, a CF substrate laminated on the TFT substrate, and liquid crystal interposed between the TFT substrate and the CF substrate;

wherein the liquid crystal display panel further comprises a first polarizer laminated on a surface of the TFT substrate that is away from the CF substrate and a second polarizer laminated on a surface of the CF substrate that is away from the TFT substrate;

wherein the backlight module further comprises a backlight source arranged inside the backplane, a reflector plate arranged inside the backplane, a light guide plate and arranged on the reflector plate, and an optical film assembly arranged atop the light guide plate; and wherein the backlight source comprises a linear LED light bar, which is fixed by thermal paste to the side board of the backplane.

The efficacy of the present invention is that the present invention provides a liquid crystal display module, which forms a projection that is set toward the side wall of a bezel and forms a threaded hole through drawing tapping applied to a side board of a backplane of a backlight module and also forms a receiving hole in the side wall of the bezel to correspond to the projection to completely receive the projection in the receiving hole, with a bolt being applied to secure the projection and the receiving hole together, so as to couple the backplane and the bezel in a manner to effectively reduce the thickness of the bezel and thus facilitates realization of bezel slimming of a liquid crystal display device.

For better understanding of the features and technical contents of the present invention, reference will be made to the following detailed description of the present invention and the attached drawings. However, the drawings are provided for the purposes of reference and illustration and are not intended to impose undue limitations to the present invention.

BRIEF DESCRIPTION OF THE DRAWINGS

The technical solution, as well as beneficial advantages, of the present invention will be apparent from the following detailed description of one or more embodiments of the present invention, with reference to the attached drawings. In the drawings.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 1:
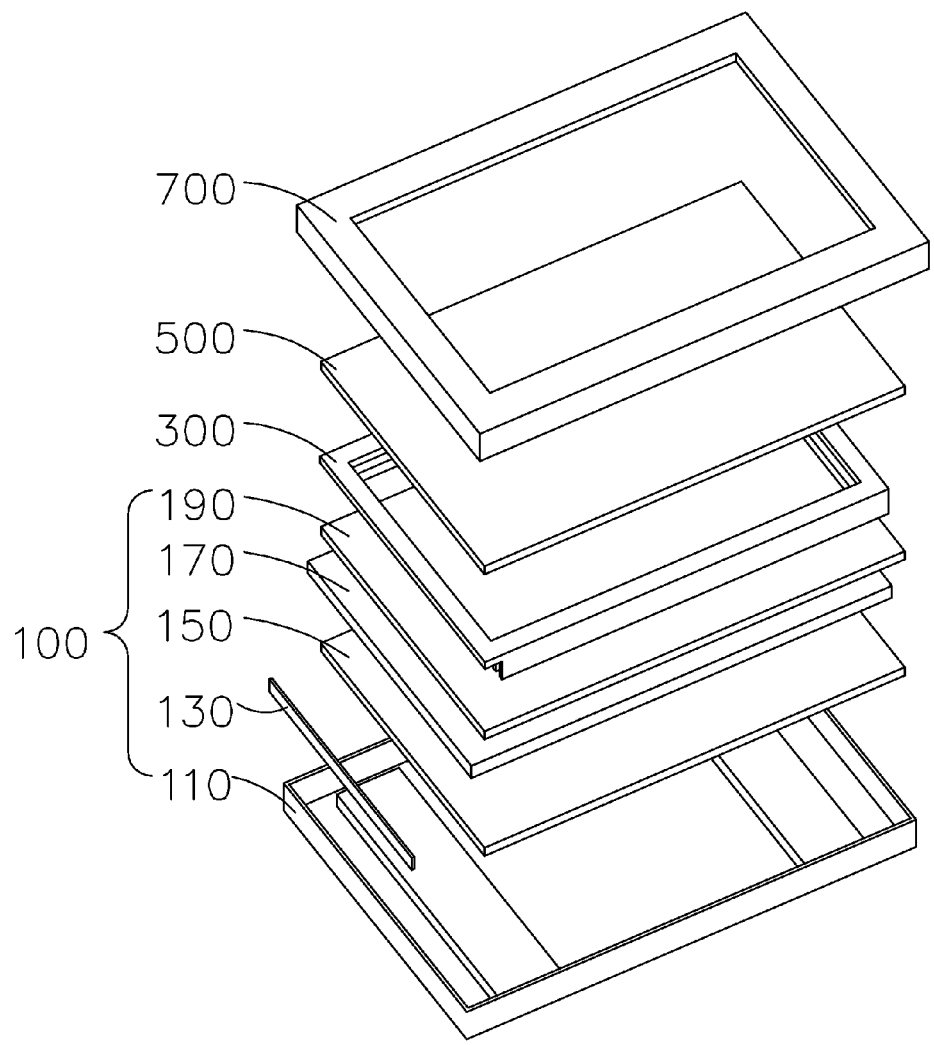
FIG. 1 is an exploded view showing a conventional liquid crystal display module.
Figure 2:
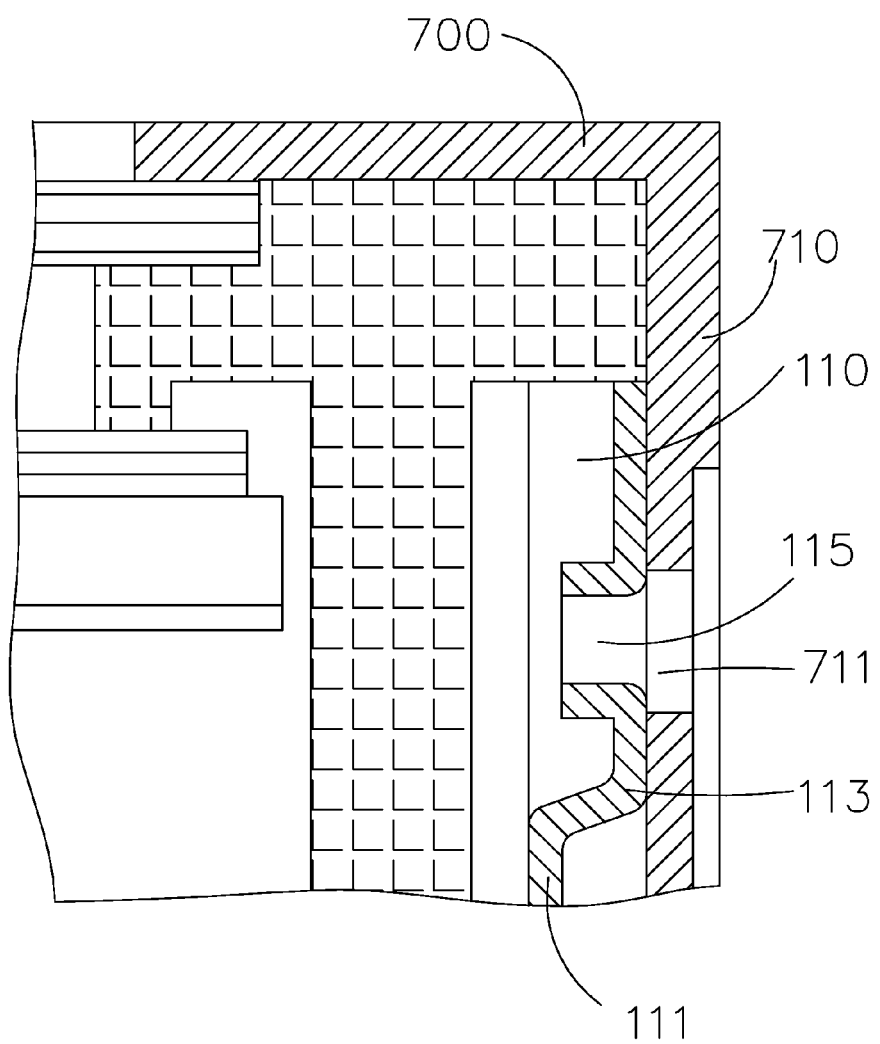
FIG. 2 is a cross-sectional view illustrating assembling of the conventional liquid crystal display module.
Figure 3:
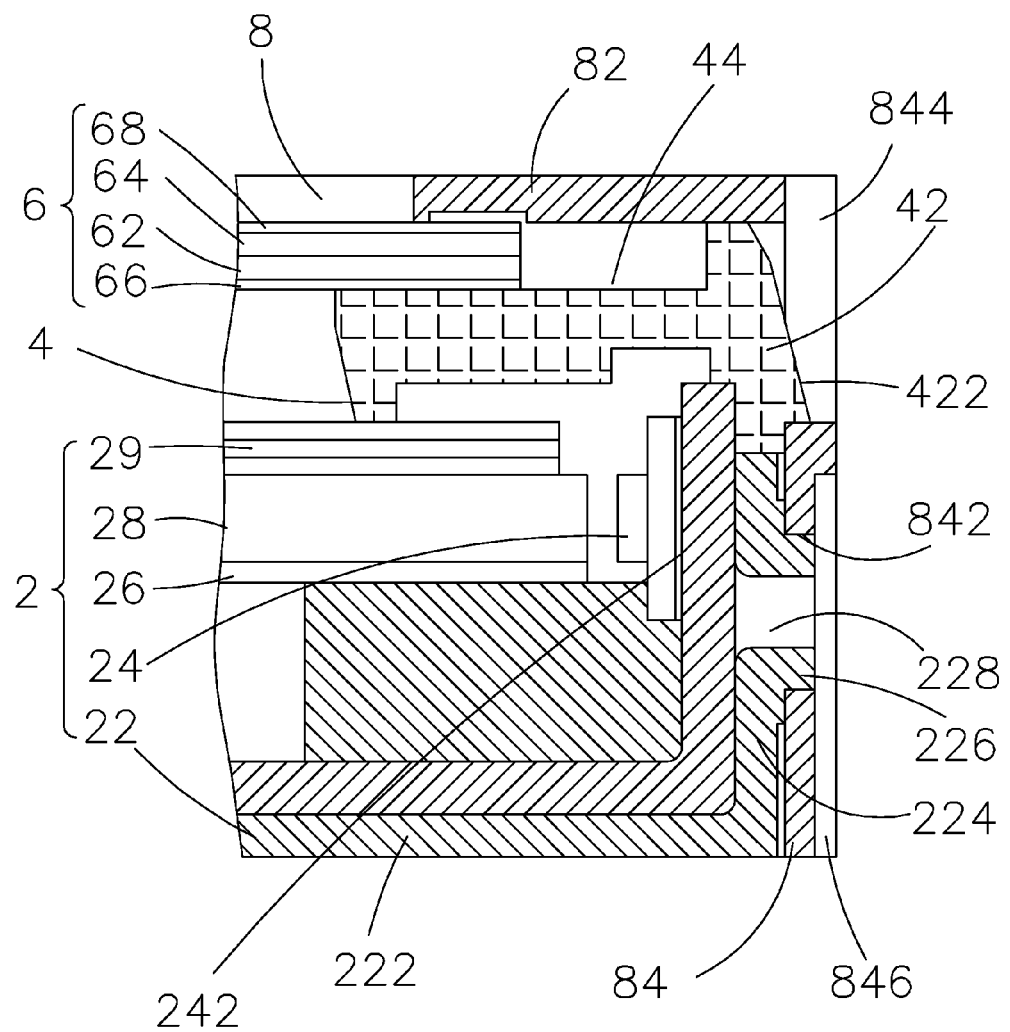
FIG. 3 is a cross-sectional view showing the liquid crystal display module according to the present invention.
Figure 4:
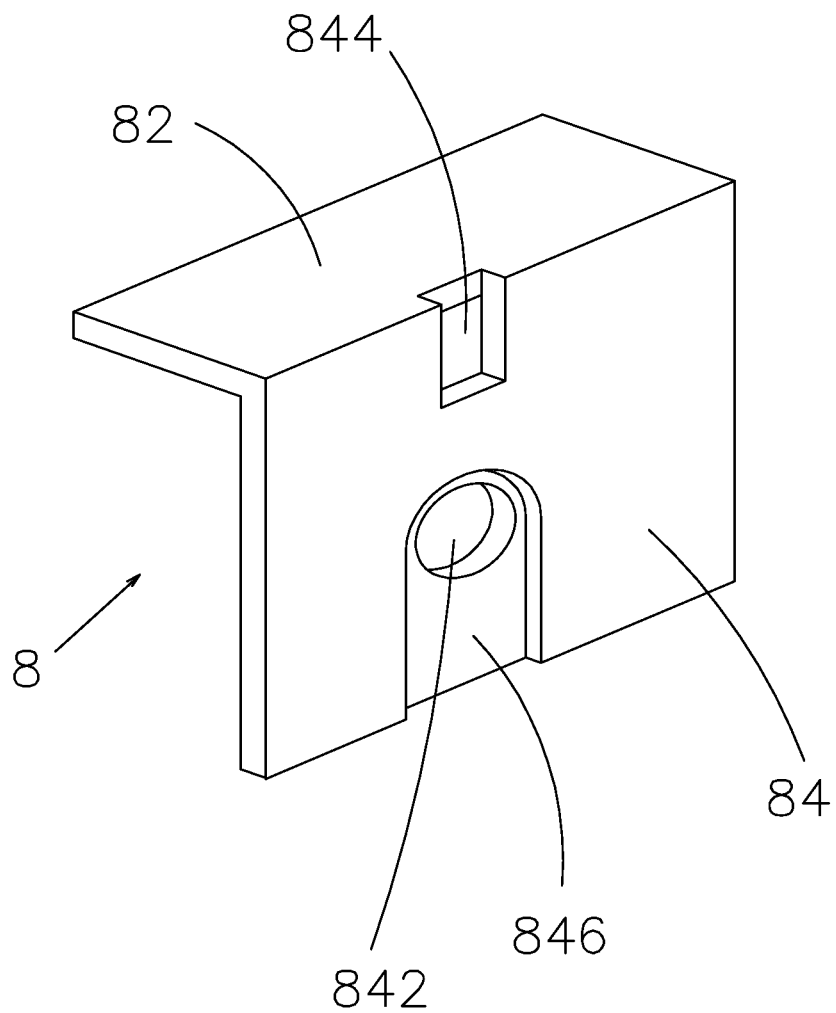
FIG. 4 is a perspective view of a portion of a bezel of the liquid crystal display module according to the present invention.
Figure 5:
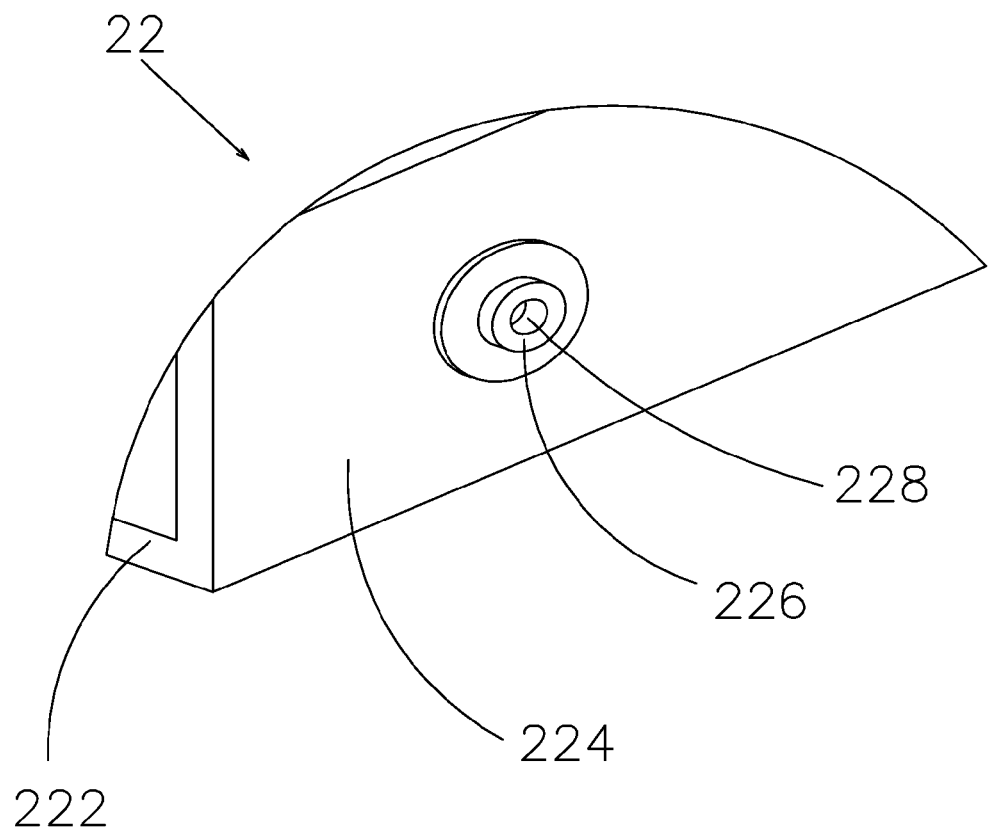
FIG. 5 is a perspective view of a portion of a backplane of the liquid crystal display module according to the present invention.

Referring to FIGS. 3-5, the present invention provides a liquid crystal display module, which comprises: a backlight module 2, a mold frame 4 arranged on the backlight module 2, a liquid crystal display panel 6 arranged on the mold frame 4, and a bezel 8 arranged on the liquid crystal display panel 6 and fixed to the backlight module 2. The mold frame 4 supports the liquid crystal display panel 6 and the bezel 8 fix the liquid crystal display panel 6 to the backlight module 2. The backlight module 2 provides a homogeneous-luminous surface light source to the liquid crystal display panel 6 to allow the liquid crystal display panel 8 to display images.

The backlight module 2 comprises a backplane 22. The backplane 22 comprises a bottom board 222 and a side board 224 connected to the bottom board 222. The bezel 8 comprise a front wall 82 and a side wall 84 connected to the front wall 82. The side board 224 forms a projection 226 toward the side wall 84. The projection 226 forms a threaded hole 228. The side wall 84 forms a receiving hole 842 corresponding to the projection 226. The projection 226 is completely received in the receiving hole 842 and is secured to the receiving hole 842 by a bolt (not shown) so as to fix the backlight source 2 and the liquid crystal display panel 6 together. Such a way of fixing may shorten the width W of the front wall 82 of the bezel 8, when compared to the conventional way of side fixing, so as to facilitate bezel slimming for liquid crystal display device.

The projection 226 has a height that is smaller than or equal to depth of the receiving hole 842 to allow the projection 226 to be completely received in the receiving hole 842, causing no interference to the assembly of other components. In the instant embodiment, the projection 226 and the threaded hole 228 are formed through drawing tapping, so that the projection 226 and the threaded hole 228 are formed simultaneously with a simple operation.

It is noted that the side wall 84 forms an opening 844. The opening 844 is located above the receiving hole 842. The mold frame 4 forms an outward-projecting engagement section 42 corresponding to the opening 844. The engagement section 42 comprises a slope 422 that is inclined outward, whereby when the bezel 8 is mounted to the backplane 22, due to the interference of the engagement section 42 to the side wall 84, the side wall 84 slides down along the slope 422 without contacting the projection 226 to thereby protect the projection 226 from being deformed by impact with the side wall 84. With the progress of the bezel 8 sliding downward, the engagement section 42 is received into the opening 844 and at the same time, due to the interference of the engagement section 42 to the side wall 84, the side wall 84 springs back and resumes the original shape thereby receiving the projection 226 into the receiving hole 842 to achieve retention and positioning between the backplane 22 and the bezel 8.

The side wall 84 also forms a recess 846 and the receiving hole 842 is formed in the recess 846. When a bolt is applied for fixing, the bolt is screwed into the threaded hole 228 with a bolt head positioned against bottom of the recess 846. The recess 846 has a depth that is greater than or equal to the thickness of the bolt head, whereby in a subsequent assembling operation, the bolt will not interfere with the assembling operation.

The mold frame 4 forms a receiving chamber 44 corresponding to the liquid crystal display panel 6 to allow the liquid crystal display panel 6 to be received in the receiving chamber 44. Preferably, the mold frame 4 is made of a resilient material to effect cushioning to the liquid crystal display panel 6 for better protection of the liquid crystal display panel 6.

The liquid crystal display panel 6 comprises a thin-film transistor (TFT) substrate 62, a color filter (CF) substrate 64 laminated on the TFT substrate 62, and liquid crystal (not shown) interposed between the TFT substrate 62 and the CF substrate 64. The liquid crystal display panel 6 further comprises a first polarizer 66 laminated on a surface of the TFT substrate 62 that is away from the CF substrate 64 and a second polarizer 68 laminated on a surface of the CF substrate 64 that is away from the TFT substrate 62.

The backlight module 2 further comprises a backlight source 24 arranged inside the backplane 22, a reflector plate 26 arranged inside the backplane 22, a light guide plate and 28 arranged on the reflector plate 26, and an optical film assembly 29 arranged atop the light guide plate 28. The backlight source 24 comprises a linear light-emitting diode (LED) light bar, which is fixed by thermal paste 242 to the side board 224 of the backplane 22.

In summary, the present invention provides a liquid crystal display module, which forms a projection that is set toward the side wall of a bezel and forms a threaded hole through drawing tapping applied to a side board of a backplane of a backlight module and also forms a receiving hole in the side wall of the bezel to correspond to the projection to completely receive the projection in the receiving hole, with a bolt being applied to secure the projection and the receiving hole together, so as to couple the backplane and the bezel in a manner to effectively reduce the thickness of the bezel and thus facilitates realization of bezel slimming of a liquid crystal display device.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A liquid crystal display module, comprising a backlight module, a mold frame arranged on the backlight module, a liquid crystal display panel arranged on the mold frame, and a bezel arranged on the liquid crystal display panel and fixed to the backlight module, the backlight module comprising a backplane, the backplane comprising a bottom board and a side board connected to the bottom board, the bezel comprising a front wall and a side wall connected to the front wall and being fit over the backplane to have the side wall located outside the side board of the backplane, the side board forming a projection toward the side wall, the projection forming a threaded hole, the side wall forming a receiving hole corresponding to the projection, the projection being completely received in the receiving hole and secured to the receiving hole by a bolt;
wherein the mold frame comprises an outward-projecting engagement section that defines a slope for temporarily and elastically expanding the side wall of the bezel to form a free space for the passage of the projection of the side board so as to avoid interference with the projection of the side board during fitting of the bezel to the backplane.

2. The liquid crystal display module as claimed in claim 1, wherein the side wall forms an opening, the opening being located above the receiving hole to receive the outward-projecting engagement section therein thereby allowing the side wall of the bezel to spring back.

3. The liquid crystal display module as claimed in claim 1, wherein the projection has a height that is smaller than or equal to depth of the receiving hole.

4. The liquid crystal display module as claimed in claim 1, wherein the projection and the threaded hole are formed through drawing tapping.

5. The liquid crystal display module as claimed in claim 1, wherein the side wall also forms a recess and the receiving hole is formed in the recess, whereby when a bolt is applied for fixing, the bolt is screwed into the threaded hole with a bolt head positioned against bottom of the recess, the recess having a depth that is greater than or equal to the thickness of the bolt head.

6. The liquid crystal display module as claimed in claim 1, wherein the mold frame forms a receiving chamber corresponding to the liquid crystal display panel to allow the liquid crystal display panel to be received in the receiving chamber.

7. The liquid crystal display module as claimed in claim 1, wherein the liquid crystal display panel comprises a TFT substrate, a CF substrate laminated on the TFT substrate, and liquid crystal interposed between the TFT substrate and the CF substrate.

8. The liquid crystal display module as claimed in claim 7, wherein the liquid crystal display panel further comprises a first polarizer laminated on a surface of the TFT substrate that is away from the CF substrate and a second polarizer laminated on a surface of the CF substrate that is away from the TFT substrate.

9. The liquid crystal display module as claimed in claim 1, wherein the backlight module further comprises a backlight source arranged inside the backplane, a reflector plate arranged inside the backplane, a light guide plate and arranged on the reflector plate, and an optical film assembly arranged atop the light guide plate.

10. The liquid crystal display module as claimed in claim 9, wherein the backlight source comprises a linear LED light bar, which is fixed by thermal paste to the side board of the backplane.

11. A liquid crystal display module, comprising a backlight module, a mold frame arranged on the backlight module, a liquid crystal display panel arranged on the mold frame, and a bezel arranged on the liquid crystal display panel and fixed to the backlight module, the backlight module comprising a backplane, the backplane comprising a bottom board and a side board connected to the bottom board, the bezel comprising a front wall and a side wall connected to the front wall and being fit over the backplane to have the side wall located outside the side board of the backplane, the side board forming a projection toward the side wall, the projection forming a threaded hole, the side wall forming a receiving hole corresponding to the projection, the projection being completely received in the receiving hole and secured to the receiving hole by a bolt;
- wherein the mold frame comprises an outward-projecting engagement section that defines a slope for temporarily and elastically expanding the side wall of the bezel to form a free space for the passage of the projection of the side board so as to avoid interference with the projection of the side board during fitting of the bezel to the backplane;
- wherein the side wall forms an opening, the opening being located above the receiving hole to receive the outward-projecting engagement section therein thereby allowing the side wall of the bezel to spring back;
- wherein the projection has a height that is smaller than or equal to depth of the receiving hole;
- wherein the projection and the threaded hole are formed through drawing tapping;
- wherein the side wall also forms a recess and the receiving hole is formed in the recess, whereby when a bolt is applied for fixing, the bolt is screwed into the threaded hole with a both head positioned against bottom of the recess, the recess having a depth that is greater than or equal to the thickness of the bolt head;
- wherein the mold frame forms a receiving chamber corresponding to the liquid crystal display panel to allow the liquid crystal display panel to be received in the receiving chamber;
- wherein the liquid crystal display panel comprises a TFT substrate, a CF substrate laminated on the TFT substrate, and liquid crystal interposed between the TFT substrate and the CF substrate;
- wherein the liquid crystal display panel further comprises a first polarizer laminated on a surface of the TFT substrate that is away from the CF substrate and a second polarizer laminated on a surface of the CF substrate that is away from the TFT substrate;
- wherein the backlight module further comprises a backlight source arranged inside the backplane, a reflector plate arranged inside the backplane, a light guide plate and arranged on the reflector plate, and an optical film assembly arranged atop the light guide plate; and
- wherein the backlight source comprises a linear LED light bar, which is fixed by thermal paste to the side board of the backplane.

* * * * *